F. R. FURBOS & B. T. LUMPKIN.
PLANTER.
APPLICATION FILED JAN. 3, 1911.
1,010,491.
Patented Dec. 5, 1911.
2 SHEETS—SHEET 2.
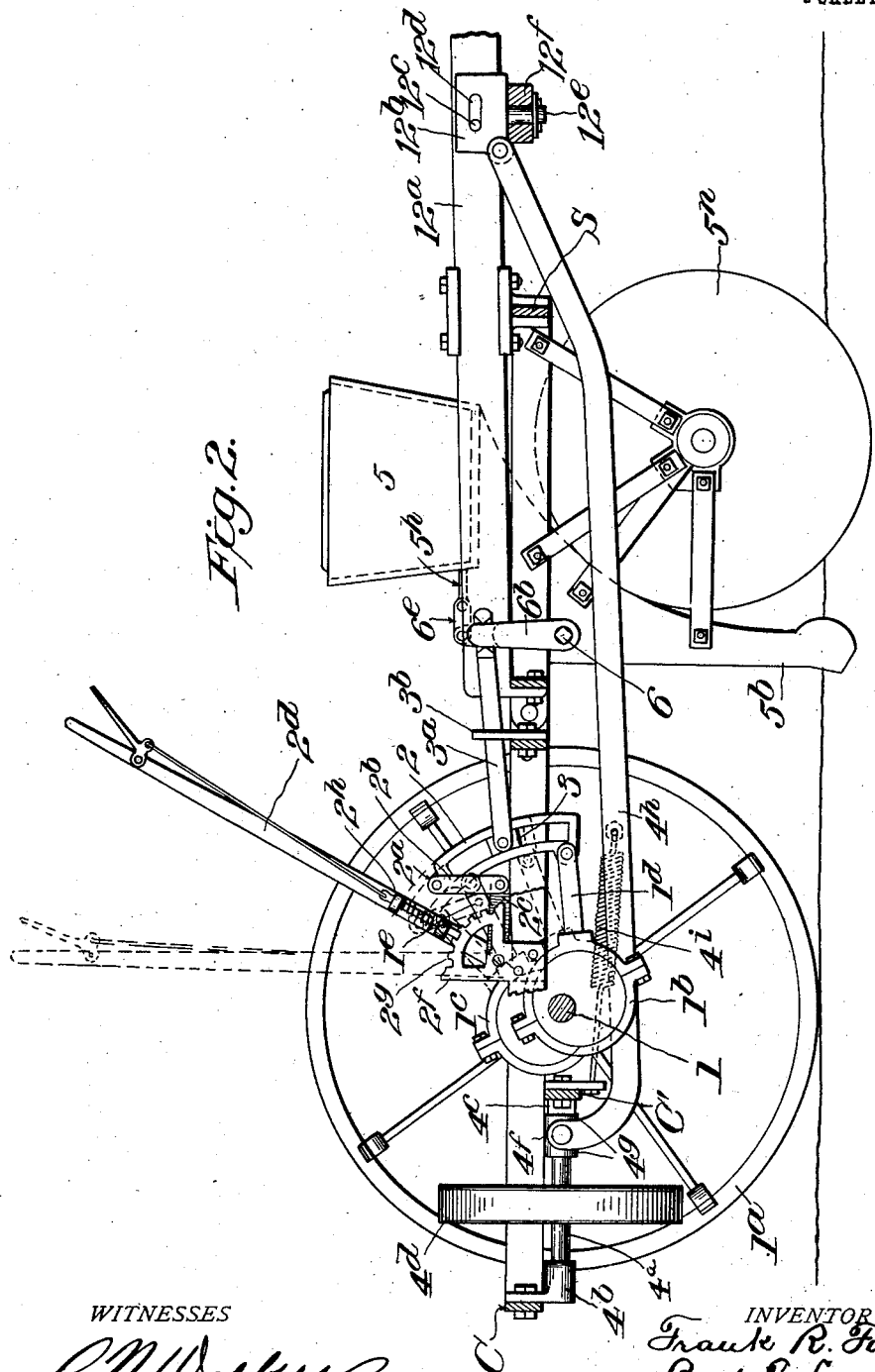
WITNESSES
INVENTOR

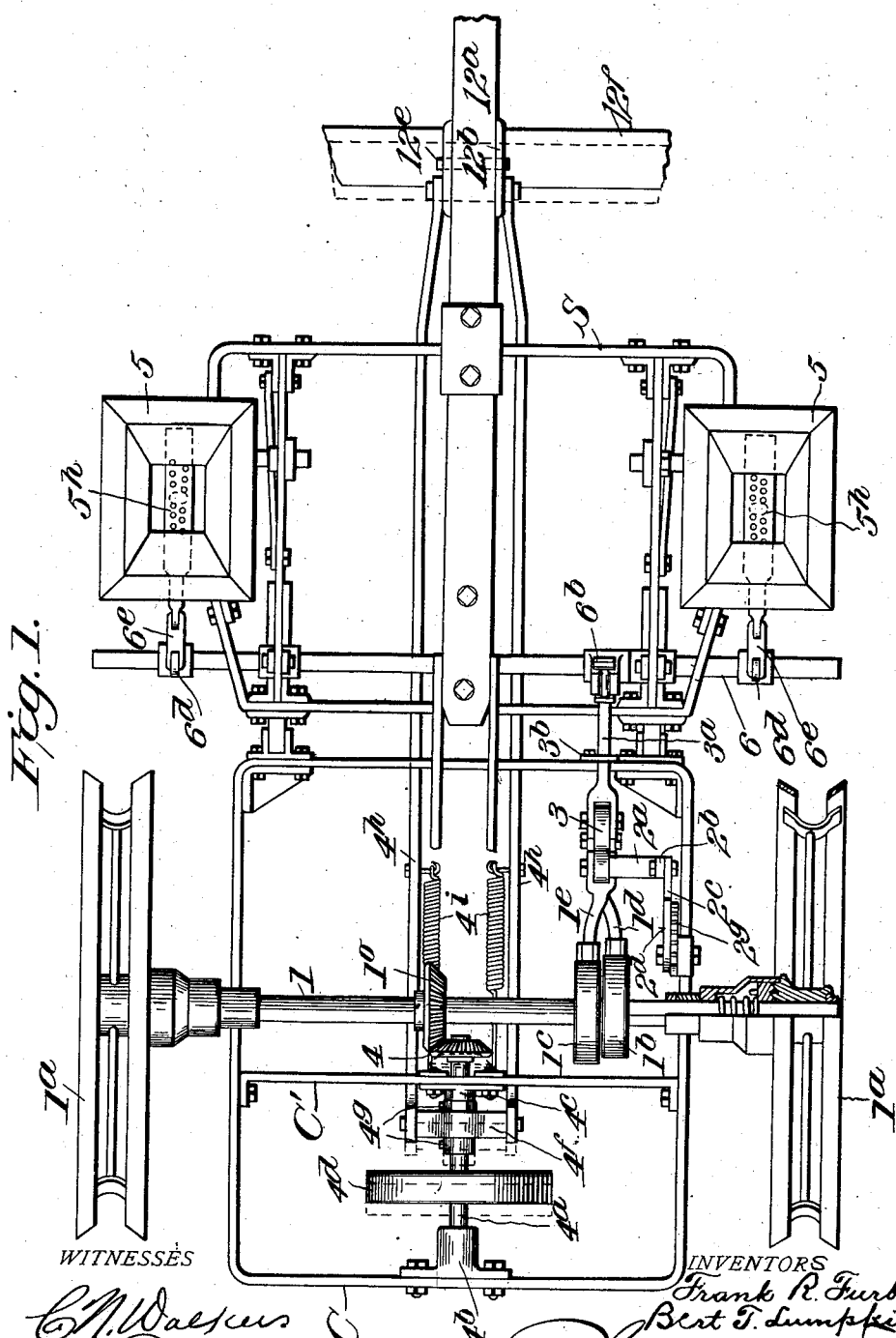

UNITED STATES PATENT OFFICE.

FRANK R. FURBOS AND BERT T. LUMPKIN, OF ROCK ISLAND, ILLINOIS.

PLANTER.

1,010,491.  Specification of Letters Patent.  Patented Dec. 5, 1911.

Application filed January 3, 1911. Serial No. 600,656.

*To all whom it may concern:*

Be it known that we, FRANK R. FURBOS and BERT T. LUMPKIN, citizens of the United States, and both residing at Rock Island, Rock Island county, and State of Illinois, have invented certain new and useful Improvements in Planters; and do hereby declare that the following is a full, clear, and exact description thereof, reference being had to the accompanying drawings, which form part of this specification.

This invention is an improvement in planting or seeding machines of the type shown in our Patent No. 953,604 dated March 29, 1910; and the object of the invention is to improve the machine shown in our said patent.

The improvements relate first to the means for operating the seeding plates from the eccentrics, and second to means for insuring regularity of feed of the grain in event the driving wheels should slip in going over the ground.

The first improvement provides novel means whereby the seed feed plates are operated by means of a link motion; which link motion is actuated by a pair of eccentrics on the driving shaft so arranged that in one position of the slotted link the seed feed plates can be stopped, although the link continues to oscillate; and by adjusting the position of said link the seed feed plates can be given a greater or less movement so as to regulate the amount of seed fed at each operation; thus enabling the feed to be varied in accordance with the kind of seed being planted by the machine.

The second improvement provides means whereby the main axle from which the seeding devices are operated is controlled by a governor so arranged that in case the wheels that carry and drive the axle should slip on wet ground, the axle would nevertheless be kept rotating so that the seed would be dropped at proper distances apart and thus irregularity in the dropping of seed which would ordinarily be caused by slipping of the carrying wheels would be avoided. And the second improvement also provides means whereby the governor or fly wheel is automatically disengaged from the axle when the machine is not in motion, or is being backed up, which enables the machine to be properly positioned preparatory to starting along a row.

In the drawings—Figure 1 is a plan view of part of a planting machine embodying the novel features of the invention. Fig. 2 is a side elevation of Fig. 1 showing the link motion in two positions by aid of dotted lines.

The planter preferably comprises a carrying frame C, and a seeding frame S, which may be constructed and shackled together as described in our aforesaid patent. The carrying frame is supported upon an axle 1 which is carried by wheels $1^a$ that are provided with ratchet clutches—not shown—which will compel the axle 1 to rotate with the wheels as the machine moves forward, but will allow the machine to back without rotating the axle. The seeding frame may be provided with seed boxes 5 in which are seeding plates $5^h$ connected by links $6^e$ to an arm $6^d$ on a rock shaft 6 mounted upon the seeding frame. Below the seed boxes 5 are furrow openers $5^n$ and seed spouts $5^b$ which are adapted to deliver seed in proper position in rear of the furrow openers. To the seeding frame is attached a tongued shaft $12^a$ to which the draft animals are attached.

The parts thus far described may be of any suitable construction, such for example as illustrated in our aforesaid patent.

*The seeding devices.*—On the shaft or axle 1 are mounted two eccentrics which are set nearly 180° apart and which are provided with eccentric straps $1^b$, $1^c$ which are respectively connected by rods $1^d$, $1^e$ to the opposite ends of a slotted link 2, which link has a laterally extending arm $2^a$ on its upper end which is pivotally connected by a link $2^b$ to a crank arm $2^c$ on the lower end of a hand lever $2^d$, which is pivoted at its lower end to a bracket $2^f$ on the frame C, said bracket having a notched segment $2^g$ which is adapted to be engaged by a hand-operated catch $2^h$ on the lever $2^d$; so that the operator by shifting hand lever $2^d$ forward or backward can raise or lower the slotted link 2. The arc-shaped slot in link 2 is engaged by a block 3 pivotally connected to the inner end of a rod $3^a$ which is guided in a slotted bracket $3^b$ attached to the front bar of frame C, and the forward end of rod $3^a$ is engaged with an arm $6^b$ on rock shaft 6. If desired the rod $3^a$ and arm $6^b$ may be detachably connected like the corresponding parts are in our aforesaid patent. When the link 2 is adjusted to the position shown in full lines in Fig. 2, the block 3 is at the pivotal center of the link, and it results that in such position the oscillatory motion imparted to the link by the eccentrics 1ᵇ, 1ᶜ will not shift rod 3ᵃ; but if the link is shifted up or down so that its pivotal center rises above, or falls below, the block 3, then the oscillation of the link will impart more or less reciprocatory motion to the rod 3ᵃ and the latter will cause arm 6ᵇ to rock the shaft 6, and through the described connections will reciprocate the seed plates 5ʰ and feed more or less grain to the seed spouts at each rotation of the axle 1.

*The governor devices.*—Upon the axle 1 is keyed a bevel gear 1ᵒ which meshes with a bevel gear 4 on a shaft 4ᵃ which is slidably journaled in a bearing 4ᵇ and 4ᶜ attached to the frame C; said shaft 4ᵃ lying at right angles to the axle and bearing 4ᶜ being attached to a cross bar C' of the frame. Upon this shaft 4ᵃ a governor, which is shown as a fly wheel 4ᵈ; and loosely mounted upon the shaft 4ᵃ is a yoke 4ᶠ which is confined between collars 4ᵍ attached to the shaft. The ends of this yoke are connected to rods 4ʰ, which extend forward beside the tongue 12ᵃ and are connected at their front ends to a slide 12ᵇ which is slidably attached to the tongue 12ᵃ by means of a pin 12ᶜ transfixing the shaft and engaging slots 12ᵈ in the sides of the slide, so that the latter has a limited play longitudinally of the shaft. From the slide 12ᵇ depends a pin 12ᵉ to which is attached the double-tree 12ᶠ. Stout helical springs 4ⁱ are connected to the rods 4ʰ and to the transverse bar C'; and these springs 4ⁱ normally tend to draw the rods 4ʰ rearward and cause them to move yoke 4ᶠ, shaft 4ᵃ and fly wheel 4ᵈ rearward and disengage the bevel gear 4 from the axle gear 1ᵒ, as indicated in dotted lines in Fig. 1. The springs 4ⁱ will hold the gear 4 out of engagement with gear 1ᵒ, unless the team is pulling upon the double-tree 12ᶠ. When the team is drawing the machine forward the pull upon the double-tree draws slide 12ᵇ forward until it is arrested by pin 12ᶜ engaging the rear end of the slots 12ᵈ. This forward movement of the slide causes rods 4ʰ to tension springs 4ⁱ and draw yoke 4ᶠ forward, thereby moving shaft 4ᵃ forward and bringing gear 4 into engagement with axle gear 1ᵒ. When these gears are in engagement, as the machine travels forward, motion is imparted to the governor 4ᵈ from the axle 1, and if either or both of the carrying wheels 1ᵃ should slide or slip on the ground, as they sometimes do in passing over stubble or soft wet places, so that the wheels fail momentarily to turn the axle, the governor, (or fly wheel 4ᵈ, which is rotating rapidly) becomes a driver and through gears 4 and 1ᵒ imparts rotary motion to the axle 1 and consequently the seeding devices will be operated at the proper time and drop the seed in hills a uniform distance apart, notwithstanding slipping of the carrying wheels 1ᵃ.

Each seed plate 5ʰ may have two sets of seed holes as shown, adapted to alternately register with the feed spout opening so that for each rotation of the axle 1 two hills of seed will be planted. When the machine reaches the end of a furrow before the operator attempts to turn the machine, he should shift the link 2 to the intermediate position shown in full lines in Fig. 2 and then, after the machine is turned and ready to start on the return furrow, he should shift the link back to planting position; if desired the eccentrics might be adjustably supported upon the shaft as described in our aforesaid patent; or the shaft may be provided with devices for shifting it while the wheels are at rest so as to enable the operator to adjust the planting devices so that the hills in all the rows will be in alinement transversely of the rows.

What we claim is:

1. In a planting machine, the combination of a driven axle, a seed hopper, and feeder therein, an adjustable link-motion comprising a link, a rod slidably connected with said link, and an eccentric for oscillating said link, and means connecting said rod with said feeder.

2. In a seeding machine, the combination of a driven shaft or axle, a link-motion comprising an eccentric on said shaft, a link, a strap on said eccentric connected with said link, and a rod slidably connected with said link; with a seed hopper, a feed plate therein, and connections between said feed plate and said rod.

3. In a planting machine, the combination of a seed hopper, a feed slide, and a rock shaft and connections for operating the feed slide; with an adjustable link-motion comprising a link, a rod slidably connected with said link and also connected with said rock shaft an eccentric and connections for oscillating said link, and means for shifting the point of connection between the rod and the link to vary the extent of movement transmitted from the eccentric to the said shaft.

4. In a planter, the combination of an axle, a link-motion operated thereby comprising a pair of eccentrics on the shaft, a link, straps on said eccentrics connected with opposite ends of said link, and a rod slidably connected with said link; with a seed hopper, and a feed plate therein, and connections between said link-motion and said feed plate.

5. In a seeding machine, the combination of a driven shaft or axle, a link-motion operated thereby comprising an eccentric on the shaft, a link, a strap on said eccentric connected with said link, a rod slidably connected with said link, and means for shifting the point of connection between the rod and said link for varying the extent of throw imparted to said rod by said link; with a seed hopper, a feed plate thereon, and connections between said feed plate and said rod.

6. In a planting machine, the combination of a seed hopper, a feed slide, and a rock shaft and connections for operating the feed slide; with an adjustable link-motion comprising a link, a rod slidably connected with said link and also connected with said rock shaft, an eccentric for oscillating said link, and a hand lever and connections for vertically adjusting the link relatively to the rod so as to vary the extent of throw imparted to said rod by said link.

7. In a seeding machine, the combination of a wheeled axle, a link-motion operated thereby comprising an eccentric on said shaft, a link adjacent the eccentric, a strap on said eccentric connected to the said link to impart an oscillatory motion thereto, a lever and connections for supporting and vertically adjusting said link, a reciprocating rod, and a slidable connection between said rod and the link; with a seed hopper, feeding devices, and connections for operating said feeding devices by said rod, substantially as described.

8. In a seeding machine, the combination of a main wheeled axle, a pair of eccentrics thereon, a slotted link suspended adjacent the eccentrics, straps on said eccentrics respectively connected to the upper and lower ends of said link to impart oscillatory motion thereto, a lever and connections for supporting and vertically adjusting said link, a reciprocating rod, a block connected with said rod and engaging the slot in the link, whereby the rod is operated by the link; with a seed hopper, a feed plate therein, a rock shaft connected with the feed plate, and connections between said rock shaft and said rod, substantially as described.

9. In a planting machine, the combination of a main axle, wheels for driving said axle when the machine moves forwardly; a fly wheel for driving the axle, and means whereby the fly wheel is freed from the axle when the machine is at rest or being backed.

10. In a planting machine, the combination of a main axle, wheels for driving said axle when the machine moves forwardly, a fly wheel on a movable shaft adjacent the axle, and gearing between the fly wheel and axle shafts, and means whereby the gearing is disengaged when the machine is at rest or being backed.

11. In combination, driving wheels, a shaft driven thereby when the machine moves forwardly, a fly wheel and gearing between the fly wheel and the shaft; with means for normally holding the fly wheel disengaged from the shaft, and means whereby when the machine is drawn forward the fly wheel is engaged with the shaft.

12. In combination, a main axle, wheels for driving said axle when the machine moves forwardly, a fly wheel mounted in the frame adjacent the axle, and gears between the fly wheel and the axle; with means whereby when the machine is drawn forward the said gears are thrown into engagement, and means whereby the gears are disengaged when the machine is at rest or being backed.

13. In combination, an axle, a gear thereon, wheels adapted to propel the axle in one direction, a shaft mounted at right angles to the axle, a fly wheel on said shaft, a gear on said shaft adapted to mesh with the gear on the axle, a yoke connected with the fly wheel, rods connected with the yoke, springs for normally retracting said rods and yoke, whereby the fly wheel gear is held out of mesh with the axle gear; with means connected with the draft appliances for drawing the rods forward so as to bring the gears into mesh when the machine is being drawn forward by the draft animals.

14. In a machine of the character specified, the combination of an axle, a gear thereon, wheels adapted to propel the axle in one direction, a shaft slidably mounted at right angles to the axle, a fly wheel on said shaft, a gear on said shaft adapted to mesh with the gear on the axle, a yoke connected with the fly wheel shaft, a slide on the tongue of the machine, draft appliances attached to said slide, rods connecting the yoke with the slide, and springs for normally retracting said rods and yoke, substantially as described.

In testimony that we claim the foregoing as our own, we affix our signatures in presence of two witnesses.

FRANK R. FURBOS.
BERT T. LUMPKIN.

In presence of—
JOHN J. GLASS,
GEO. M. NEWBERRY.

---

Copies of this patent may be obtained for five cents each, by addressing the "Commissioner of Patents, Washington, D. C."